United States Patent
Kaneda et al.

(10) Patent No.: US 6,810,128 B2
(45) Date of Patent: Oct. 26, 2004

(54) ELECTROMAGNETIC INDUCTION ACTUATOR AND PORTABLE TELECOMMUNICATIONS EQUIPMENT

(75) Inventors: Shoichi Kaneda, Adachi-ku (JP); Tsuneo Kyono, Adachi-ku (JP); Minoru Ueda, Adachi-ku (JP); Fumio Fujimori, Adachi-ku (JP)

(73) Assignee: Namiki Seimitsu Houseki Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/311,095
(22) PCT Filed: Jun. 8, 2001
(86) PCT No.: PCT/JP01/04881
§ 371 (c)(1),
(2), (4) Date: Dec. 13, 2002
(87) PCT Pub. No.: WO01/96035
PCT Pub. Date: Dec. 20, 2001

(65) Prior Publication Data
US 2003/0137406 A1 Jul. 24, 2003

(30) Foreign Application Priority Data
Jun. 16, 2000 (JP) ...................................... 2000-182046

(51) Int. Cl.⁷ .............................................. H04R 25/00
(52) U.S. Cl. ..................... 381/396; 381/420; 340/388.1
(58) Field of Search .......................... 340/388.1, 311.1; 381/396, 398, 403–404, 412, 420

(56) References Cited

U.S. PATENT DOCUMENTS

| 5,727,077 A | * | 3/1998 | Frasl | .......................... 381/396 |
| 5,747,906 A | | 5/1998 | Tajima et al. | |
| 5,894,263 A | | 4/1999 | Shimakawa et al. | |
| 6,075,866 A | * | 6/2000 | Frasl et al. | .................. 381/177 |

(List continued on next page.)

FOREIGN PATENT DOCUMENTS

| EP | 1 044 730 A1 | 10/2000 |
| EP | 1 053 796 A1 | 11/2000 |
| EP | 1 063 020 A1 | 12/2000 |
| EP | 1 096 650 A1 | 5/2001 |

OTHER PUBLICATIONS

Patent Abstracts of Japan, Publication No. 2001–104880, Apr. 17, 2001, "Vibration Generator as Well as Portable Terminal Apparatus and Portable Communication Apparatus Using the Same", Goukon et al.

*Primary Examiner*—Curtis Kuntz
*Assistant Examiner*—Phylesha Dabney
(74) *Attorney, Agent, or Firm*—Nixon Peabody LLP; Donald R. Studebaker

(57) ABSTRACT

This invention concerns an electromagnetic induction actuator to be mounted in small equipment such as portable telephones and pagers; also concerns such portable telecommunications equipment. The electromagnetic induction actuator, as well as the portable telecommunications equipment in which it is mounted, can be assembled in a thin and small package even though there are tabs as shock resistance stoppers, and has good acoustical characteristics. In the electromagnetic induction actuator there is a yoke that has tabs as stoppers to provide shock resistance, and there are springs that have inner rings, outer rings, bridge arms that connect the inner and outer rings and recesses that correspond to the tabs of the yoke. The yoke and the springs are assembled together within the housing by placing the tabs of the yoke into the corresponding recesses of the springs, fitting the inner rings of the springs around the outer periphery of the yoke, and fitting the outer rings of the springs into the inner diameter of the housing.

6 Claims, 5 Drawing Sheets

U.S. PATENT DOCUMENTS

| | | | | |
|---|---|---|---|---|
| 6,178,252 B1 | * | 1/2001 | Frasl et al. | 381/424 |
| 6,208,237 B1 | * | 3/2001 | Saiki et al. | 340/388.1 |
| 6,466,682 B2 | * | 10/2002 | An | 381/413 |
| 6,553,125 B2 | * | 4/2003 | Kobayashi et al. | 381/396 |
| 6,560,347 B2 | * | 5/2003 | Chung | 381/420 |
| 6,590,991 B1 | * | 7/2003 | Maeda | 381/409 |
| 6,611,605 B2 | * | 8/2003 | Kim | 381/406 |
| 2001/0010725 A1 | * | 8/2001 | Frasl | 381/150 |
| 2002/0061115 A1 | * | 5/2002 | Chung et al. | 381/398 |
| 2002/0076068 A1 | * | 6/2002 | Chung | 381/150 |
| 2002/0122560 A1 | * | 9/2002 | An | 381/150 |
| 2002/0131612 A1 | * | 9/2002 | Son | 381/150 |

* cited by examiner

ELECTROMAGNETIC INDUCTION ACTUATOR AND PORTABLE TELECOMMUNICATIONS EQUIPMENT

FIELD OF TECHNOLOGY

This invention concerns an electromagnetic induction actuator to be mounted in small equipment such as portable telephones, pagers, other portable telecommunications equipment, wrist watches, toys and other small pieces of equipment. It also concerns such portable telephones, pagers and other portable telecommunications equipment.

PRIOR ART

Generally speaking, electromagnetic induction actuators have a round housing that encloses a diaphragm and a magnetic circuit that consists of a voice coil mounted on the inner surface of the diaphragm, a magnet for the magnetic circuit, a yoke that surrounds and supports the magnet, and a pole piece; there are also thin springs that support the magnetic circuit. The components are assembled with the springs fitted into the inner surface of the housing supporting the magnetic circuit, including the magnet, with the diaphragm fitted into an opening in the housing, and with a voice coil positioned close to the magnetic circuit.

This electromagnetic induction actuator is constituted with the magnetic circuit mounted so that it can move within the housing, by means of thin springs, so that structurally it has high impact resistance and resists breakage if dropped by the user.

This high impact resistance has been provided conventionally by means of projections that project from the inner wall of the housing and act as stoppers for the magnetic circuit (actually the outer perimeter of the yoke) if the magnetic circuit sways too far sideways on the spring. However, placing such projections on the inner wall of the housing requires that the diameter of the housing be made enough larger to allow for the projections, and so the overall dimensions of the actuator are increased.

Attempts have been made, for example, to place tabs at intervals around the periphery of the yoke to serve as impact resistance stoppers, rather than placing projections on the inner wall of the housing. Because the yoke is supported by springs, however, if tabs are formed on the yoke it is necessary to design and form the yoke itself so that the tabs will not contact the springs.

If the yoke itself is made thicker to separate the tabs from the spring in order to avoid contact between the tabs and the spring, the overall thickness of the actuator is increased, which obstructs miniaturization.

The purpose of this invention is to place tabs to serve as impact resistance stoppers while maintaining the small dimensions of the housing, and to make the actuator as a whole thinner and smaller, thus providing an electromagnetic induction actuator with good acoustical properties.

A further purpose of this invention is to provide an electromagnetic induction actuator that has an easily assembled structure, the structural parts of which can be easily and accurately positioned.

This invention also has the purpose of providing portable telecommunications equipment characterized by the incorporation of electromagnetic induction actuators with good acoustical properties.

DESCRIPTION OF INVENTION

In the electromagnetic induction actuator of this invention there is a round housing that encloses a diaphragm that transmits vibrations; a magnetic circuit that consists of a voice coil mounted on the inner surface of the diaphragm, a magnet for the magnetic circuit, a yoke that surrounds and supports the magnet, and a pole piece; and thin springs that support the magnetic circuit. The components are assembled with the springs fitted into the inner surface of the housing supporting the magnetic circuit, including the magnet, with the diaphragm fitted into an opening in the housing, and with a voice coil positioned close to the magnetic circuit. A number of tabs that act as shock resistance stoppers are located at equal intervals around the outer rim of the yoke and extend toward the inner surface of the wall of the housing. There is a spring that has an inner ring that fits the outer periphery of the yoke, an outer ring that fits the inner diameter of the housing, bridge arms that are spaced at equal distances around the circumference of the two rings and that connect the inner and outer rings, and recesses that are spaced at the same intervals as the bridge arms and that correspond to the positions of the tabs on the yoke. The yoke and spring together are assembled within the housing by positioning the tabs of the yoke in the recesses of the spring with the outer periphery of the yoke fitted into the inner diameter of the spring, and the outer ring of the spring fitted into the inner diameter of the housing.

The electromagnetic induction actuator of this invention can also be constituted with two springs of the same shape, a yoke having shock resistance stoppers in the form of L-shaped tabs that descend from its outer rim, and a stopper ring and ring washer that fit around the outer periphery of the yoke. The outer periphery of the yoke is fitted into the inner diameter of the 1st spring with the tabs of the yoke positioned inside the corresponding recesses on the 1st ring, and the stopper ring is fitted around the outer periphery of the yoke and presses against the inner ring of the spring. The tabs of the yoke are positioned corresponding to the recesses of the 2nd spring and the inner ring of the 2nd spring is fitted around the outer periphery of the yoke, contacting the stopper ring, and the ring washer is fitted around the outer periphery of the yoke and presses against the inner ring of the spring. The outer rings of the 1st and 2nd springs are fitted inside the inner diameter of the housing so that the yoke and springs are mounted together within the housing.

The electromagnetic induction actuator of this invention can also be constituted with a spacer ring sandwiched between the outer rings of the springs, and a cover that has a raised rim that fits inside the housing. The spacer ring is sandwiched between the outer rings of the springs, and the outer rings of the springs are fitted into the inside diameter of the housing; the outer ring of the 1st spring presses against the stop rim that is inside the housing near the opening, and the raised rim of the cover is fitted into an opening in the housing on the side opposite the diaphragm. The yoke and springs together are assembled within the housing by means of the raised rim of the cover pressing against the outer ring of the 2nd spring.

In the electromagnetic induction actuator of this invention there is a round housing that encloses a diaphragm that transmits vibrations; a magnetic circuit that consists of a voice coil mounted on the inner surface of the diaphragm, a magnet for the magnetic circuit, a yoke that surrounds and supports the magnet, and a pole piece; and thin springs that support the magnetic circuit. The components are assembled with the springs fitted into the inner surface of the housing supporting the magnetic circuit, including the magnet, with the diaphragm fitted into an opening in the housing, and with a voice coil positioned close to the magnetic circuit. There is a stopper ring that has a number of tabs that act as shock resistance stoppers located at equal intervals around its outer rim, extending toward the inner surface of the wall of the housing. There is a spring that has an inner ring that fits the outer periphery of the yoke, an outer ring that fits the inner diameter of the housing, bridge arms that are spaced at equal distances around the circumference of the two rings and that connect the inner and outer rings, and recesses that are spaced at the same intervals as the bridge arms and that correspond to the positions of the tabs on the stopper ring. The yoke and spring together are assembled within the housing by positioning the tabs of the stopper ring in the recesses of the spring with the inner ring of the spring pressed by fitting the stopper ring into the outer periphery of the yoke, and the outer ring of the spring fitted into the inner diameter of the housing.

It is also possible to constitute the electromagnetic induction actuator of this invention with two springs of the same shape, a stopper ring having shock resistance stoppers in the form of tabs that project from the outer periphery of the stopper ring, and a ring washer that fit around the outer periphery of the yoke. The outer periphery of the yoke is fitted into the inner ring of the 1st spring with the tabs of the stopper ring positioned inside the corresponding recesses on the 1st spring, and the stopper ring is fitted around the outer periphery of the yoke and presses against inner ring of the spring. The tabs of the stopper ring are positioned corresponding to the recesses of the 2nd spring and the inner ring of the 2nd spring is fitted around the outer periphery of the yoke, contacting the stopper ring, and the ring washer is fitted around the outer periphery of the yoke and presses against the inner ring of the spring. The outer rings of the 1st and 2nd springs are fitted inside the inner diameter of the housing so that the yoke and springs are mounted together within the housing.

Moreover, it is possible to constitute the electromagnetic induction actuator of this invention with a spacer ring sandwiched between the outer rings of the springs, and a cover that has a raised rim that fits inside the housing. The spacer ring is sandwiched between the outer rings of the springs, and the outer rings of the springs are fitted into the inside diameter of the housing; the outer ring of the 1st spring presses against the stop rim that is inside the housing near the opening, and the raised rim of the cover is fitted into an opening in the housing on the side opposite the diaphragm. The yoke and springs together are assembled within the housing by means of the raised rim of the cover pressing against the outer ring of the 2nd spring.

Further, it is possible to constitute the portable telecommunications equipment of this invention by incorporating within it any of the electromagnetic induction actuators described above.

OPTIMUM MODE OF IMPLEMENTATION

Figure 1:
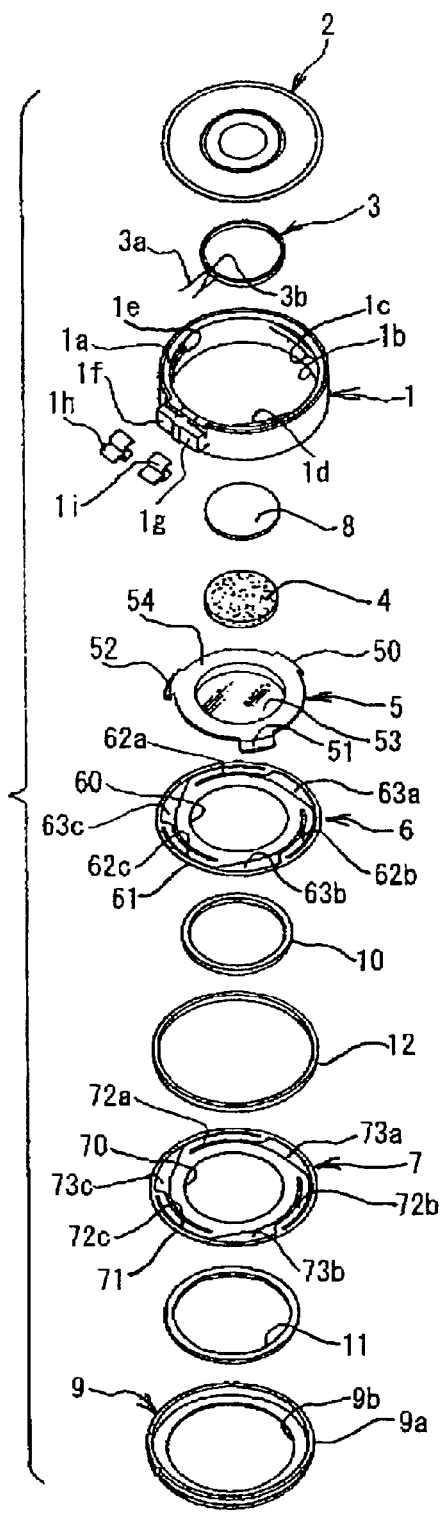
FIG. 1 is an oblique exploded view of the constituent parts of one electromagnetic induction actuator of this invention.
Figure 2:
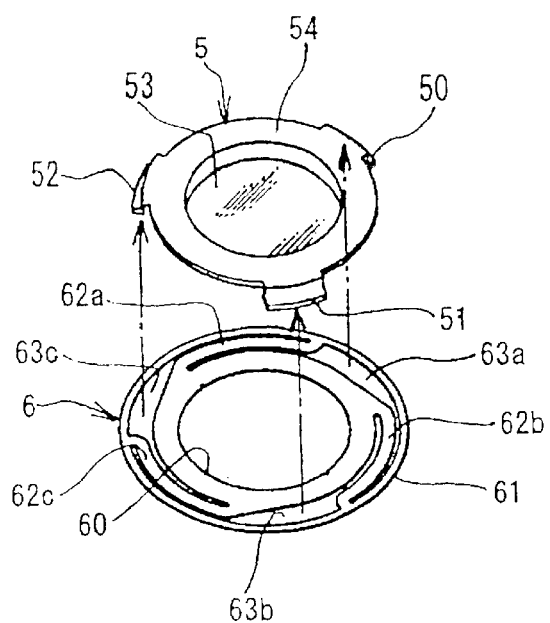
FIG. 2 is an explanatory drawing showing the mounting of the yoke and spring, among the constituent parts in FIG. 1.
Figure 3:
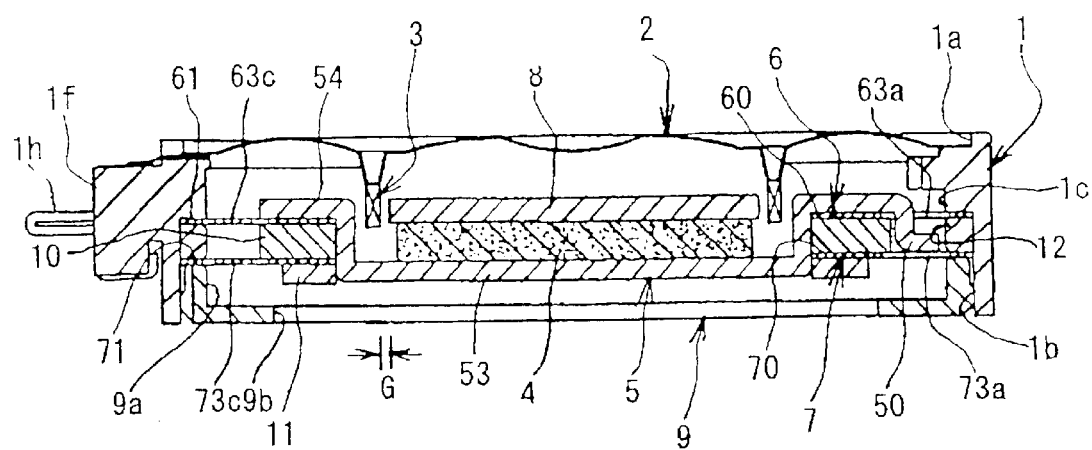
FIG. 3 is a cross section of the electromagnetic induction actuator assembled from the constituent parts in FIG. 1.
Figure 4:
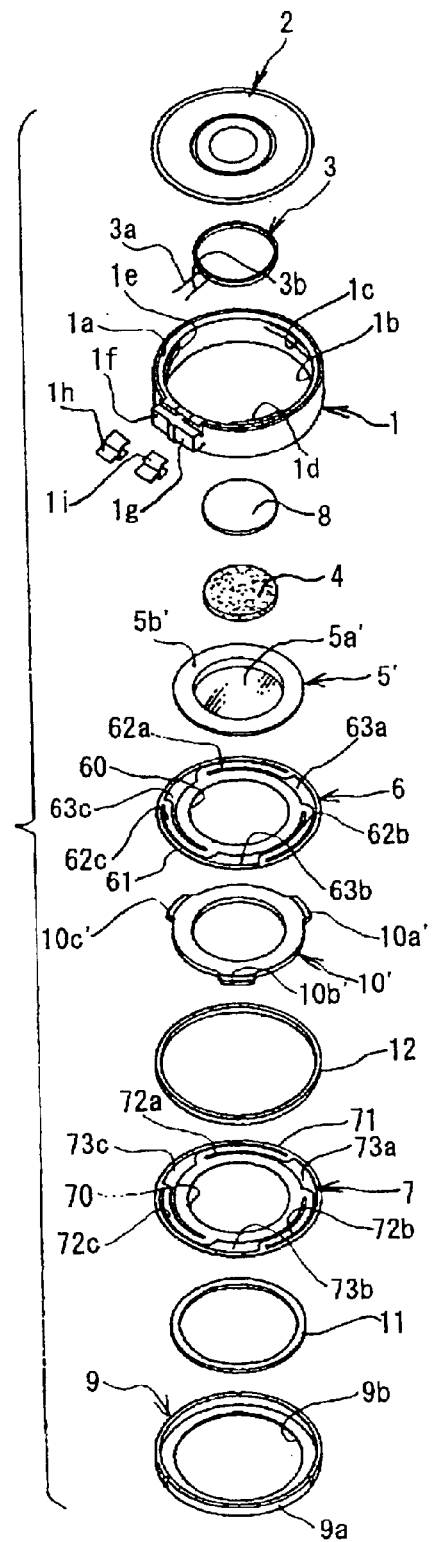
FIG. 4 is an oblique exploded view of the constituent parts of another electromagnetic induction actuator of this invention.
Figure 5:
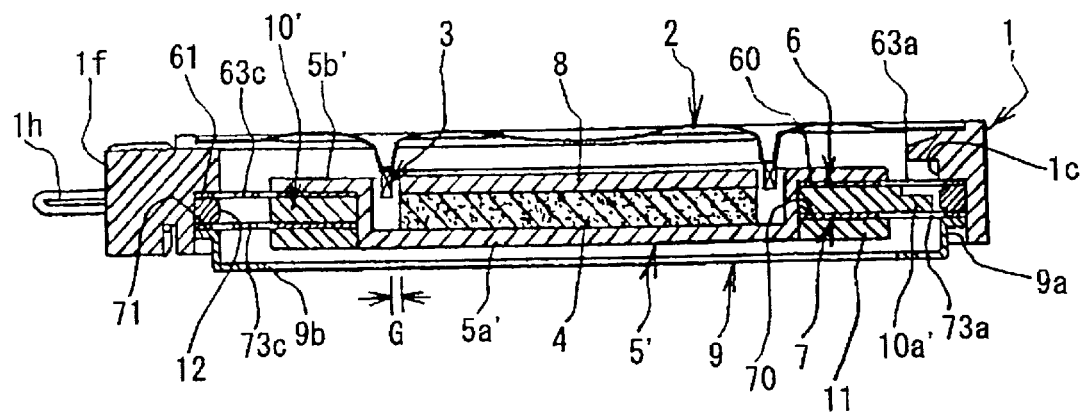
FIG. 5 a cross section of the electromagnetic induction actuator assembled from the constituent parts in FIG. 4.

This invention is explained below with reference to the attached drawings, of which FIGS. 1 to 3 show the mode of the electromagnetic induction actuator of the 1st invention, and FIGS. 4 and 5 show the mode of the electromagnetic induction actuator of the second invention. In the following, the same symbols are use to label parts that are common to both modes.

The basic structure that is common to both, as shown in FIGS. 1 and 4, includes a circular housing 1 that has openings 1*a*, 1*b* on the two sides, a diaphragm 2 that transmits vibrations, a voice coil 3 that is attached to the inner surface of the diaphragm 2, a magnet 4 for the magnetic circuit, a yoke 5 that supports the magnet 4, and thin springs 6, 7 that support the yoke 5.

Within this structure, the two springs 6, 7 have the same shape and constitute a double suspension. Other common parts of the basic structure include a pole piece 8 that is fixed to the upper surface of the magnet 4, and a cover 9 that fits into the opening 1*b* of the housing 1. The cover 9 has a raised rim 9*a* that fits inside the housing 1, and the bottom 9*b* takes the shape of an open frame.

In the housing 1 there are three or four evenly spaced stop rims 1*c* to 1*e*, which project inward near the opening 1*a* and hold down the spring 6 described below. Terminal stages 1*f*, 1*g* project outward from one side of the housing 1, and positive and negative terminal fittings 1*h*, 1*i* are mounted on the terminal stages 1*f*, 1*g*.

In the electromagnetic induction actuator of the 1st invention there are about three tabs 50 to 52 that act as shock resistance stoppers located at equal intervals around the outer rim of the yoke 5 and extending toward the inner surface of the wall of the housing 1. The yoke 5 is made up of a concave saucer 53 within which a magnet 4 is fixed so as to maintain a magnetic gap G for the insertion of a voice coil that will be described below, and a brim 54 that spreads outward from the opening of the saucer 53. The tabs 50 to 52 are L-shaped tabs that descend from the outer rim of the brim 54.

The springs 6, 7 are stamped from a thin metal sheet, and as shown in FIGS. 1 and 2 (only the spring 6 is shown in FIG. 2), they have inner rings 60, 70 that fit around the outer periphery of the saucer 53 of the yoke 5, outer rings 61, 71 that fit into the inner diameter of the housing 1, about three bridge arms 62*a* to 62*c*, 72*a* to 72*c*, that are spaced at equal distances around the circumference of the two rings 60, 61, 70, 71 and that connect the inner rings 60, 70 to the outer rings 61, 71, and recesses 63*a* to 63*c*, 73*a* to 73*c* that are spaced at the same intervals as the bridge arms 62*a* to 62*c*, 72*a* to 72*c* and that correspond to the positions of the tabs 50 to 52 on the yoke 5.

Additionally there is a stopper ring 10 that fits around the outer periphery of the saucer 53 of the yoke 5, a ring washer 11 of which the inner diameter is formed as a shallow hexagon, and a spacer ring 12 that is sandwiched between the outer rings 61, 71 of the springs 6, 7.

To assemble these constituent parts into the electromagnetic induction actuator of the 1st invention, as shown in FIG. 3 (labels are applied only to the parts that appear in the cross-section view), the tab 50 of the yoke 5 is positioned in the corresponding recess 63*a* of the 1st spring 6 and the inner ring 60 of the 1st spring 6 is fitted around the outer periphery of the saucer 53 of the yoke 5. This spring 6 is fitted in place with its inner ring 60 in contact with the brim 54 of the yoke 5. Then the stopper ring 10 is fitted around the outer periphery of the saucer 53 of the yoke 5 and presses against the inner ring 60 of the 1st spring 6.

Next the tab 50 of the yoke 5 is positioned in the corresponding recess 73a of the 2nd spring 7 and the inner ring 70 of the 2nd spring 7 is fitted around the outer periphery of the saucer 53 of the yoke 5, with the inner ring 70 in contact with the stopper ring 10; the ring washer 11 is also fitted around the outer periphery of the saucer 53 of the yoke 5, and presses against the inner ring 70 of the 2nd spring 7. The spacer ring 12 is sandwiched between the outer rings 61, 71 of the springs 6, 7 to form a single spring assembly.

In this spring assembly, the tab 50 of the yoke 5 is positioned inside the corresponding recess 63a of the 1st spring 6, and is positioned corresponding to the recess 73a of the 2nd spring 7, by which means contact between the tab 50 of the yoke 5 and the 1st and 2nd springs 6, 7 can be prevented. Moreover, because the springs 6, 7 are fitted around the outer periphery of the saucer 53 of the yoke 5 and are assembled within the thickness of the saucer 53 of the yoke 5, the assembly thickness of the springs 6, 7 can be kept thin.

Moreover, not only can the constituent parts be easily assembled around the yoke 5 so that they can be constituted as a single spring assembly before assembly in the housing 1, but when the 1st and 2nd springs 6, 7 are attached it is possible to accurately align the tabs 50 to 52 of the yoke 5 with the recesses 63a to 63c, 73a to 73c of the 1st and 2nd springs 6, 7.

This spring assembly has the spacer ring 12 sandwiched between the outer rings 61, 71 of the springs 6, 7; by fitting the spacer ring 12 and the outer rings 61, 71 into the inner diameter of the housing 1, the yoke 5 together with the magnet 4 and the pole piece 8 can be assembled into the housing 1.

This spring assembly can be fixed in place within the housing 1 by pressing the outer ring 61 of the 1st spring 6 against the stop rims 1c to 1e that protrude inward near the opening 1a of the housing 1 and fitting the raised rim 9a of the cover 9 into the opening 1b of the housing 1 so that the raised rim 9a of the cover 9 presses against the outer ring 71 of the 2nd ring 7. The diaphragm 2 is fitted and fixed into the opening 1a of the housing 1, with the voice coil 3 positioned close to the yoke 5 and the pole piece 8 but separated from them by a magnetic gap G. The opening 1a of the housing 1 is formed with a step that fits the outer periphery of the diaphragm 2.

In the electromagnetic induction actuator constituted in this way, the tabs 50 to 52 are present even if the yoke 5 is made thin, and so it is possible to assure the weight needed for the action of the springs 6, 7. Because these tabs 50 to 52 are set on the outer edge of the yoke 5 and are made in an L-shape that descends in the direction of the thickness of the yoke 5, the overall weight balance of the yoke is kept even.

Additionally, the springs 6, 7 have a double suspension structure, and the spacer ring 12 is sandwiched between the outer rings 61, 71 that are pressed between the stop rims 1c to 1e of the housing 1 and the raised rim 91 of the cover 9; by this means the spring assembly is stably assembled and fixed within the housing 1. Accordingly, the tabs 50 to 52 do not contact the springs 6, 7, of course, and an assembly with good vibration balance at large amplitudes is easily assembled, and it is possible to provide excellent acoustical properties.

This electromagnetic induction actuator can be mounted in small equipment such as portable telephones, pagers, other portable telecommunications equipment, wrist watches, toys and other small pieces of equipment. It is particularly good for portable telephones, pagers and other portable telecommunications equipment and provides such portable telecommunications equipment with excellent acoustical properties.

In the electromagnetic induction actuator of the 2nd invention there are, in addition to the yoke 5 described above, a stopper ring 10' that has about three tabs 10a' to 10c' that act as shock resistance stoppers located at equal intervals around its outer rim and extending toward the inner surface of the wall of the housing 1, as shown in FIG. 4. These tabs 10a' to 10c' are flat and slightly thinner than the stopper ring 10'.

The yoke 5' is made up of a concave saucer 5a' within which a magnet 4 is fixed, and a brim 5b' that spreads outward from the opening of the saucer 5a'. The other constituent parts—the housing 1, the diaphragm 2, the coil 3, the magnet 4, the springs 6, 7, the pole piece 8, the cover 9, the ringer washer 11 and the spacer ring 12 are all the same as in the electromagnetic induction actuator of the 1st invention.

To assemble these constituent parts into the electromagnetic induction actuator of the 2nd invention, as shown in FIG. 5, the tabs 10a' to 10c' of the stopper ring 10' are aligned with the corresponding recesses 63a to 63c of the 1st spring 6 and the inner ring 60 of the 1st spring 6 is fitted around the outer periphery of the saucer 5a' of the yoke 5'. Then the stopper ring 10 is fitted around the outer periphery of the saucer 5a' of the yoke 5 and presses against the inner ring 60 of the 1st spring 6.

At the same time, the tabs 10a' to 10c' of the stopper ring 10' are aligned with the corresponding recesses 73a to 73c of the 2nd spring 7 and the inner ring 70 of the 2nd spring 7 is fitted around the outer periphery of the saucer 5a' of the yoke 5, with the inner ring 70 in contact with the stopper ring 10'; the ring washer 11 is also fitted around the outer periphery of the saucer 5a' of the yoke 5, and presses against the inner ring 70 of the 2nd spring 7. The spacer ring 12 is sandwiched between the outer rings 61, 71 of the springs 6, 7 to form the spring assembly.

In this spring assembly, the outer rings 61, 71 of the springs 6, 7 are fitted into the inner diameter of the housing 1, and by pressing the outer ring 61 of the first spring 6 with the stop rims 1c to 1e of the housing 1 as described above, fitting the raised rim 9a of the cover 9 into the opening 1b of the housing 1 and pressing the outer ring 7a of the second spring 7 with the raised rim 9a of the cover 9, it is possible to set the spring assembly into the housing 1.

In the electromagnetic induction actuator thus constituted, the tabs 10a' to 10c' of the stopper ring 10' are aligned with the corresponding recesses 63a to 63c of the 1st spring 6, and the tabs 10a' to 10c' of the stopper ring 10' are aligned with the corresponding recesses 73a to 73c of the 2nd spring 7, by which means contact between the tab tabs 10a' to 10c' of the stopper ring 10' and the 1st and 2nd springs 6, 7 can be prevented. Moreover, because the springs 6, 7 and the stopper ring 10' are assembled within the thickness of the saucer 5a' of the yoke 5, the assembly thickness of the springs 6, 7 including the yoke 5' can be kept thin.

Because of the tabs 10a' to 10c' on the stopper ring 10', it is possible to assure the weight needed for the action of the springs 6, 7, and because these tabs 10a' to 10c' are set on the stopper ring 10' that intervenes between the springs 6,7, the overall weight balance of the yoke is kept even.

The springs 6, 7 have a double suspension structure, and the spacer ring 12 is sandwiched between the outer rings 61, 71 that are pressed between the stop rims 1c to 1e of the housing 1 and the raised rim 91 of the cover 9; by this means the spring assembly is stably assembled and fixed within the housing 1. Accordingly, an assembly with good vibration balance at large amplitudes is easily assembled, and it is possible to provide excellent acoustical properties.

This electromagnetic induction actuator can be mounted in small equipment such as portable telephones, pagers, other portable telecommunications equipment, wrist watches, toys and other small pieces of equipment. It is particularly good for portable telephones, pagers and other portable telecommunications equipment and provides such portable telecommunications equipment with excellent acoustical properties.

Figure 6:
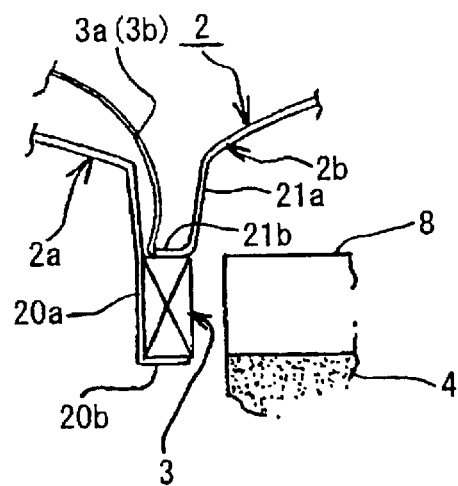
FIG. 6 is an explanatory drawing showing the a coil wiring layout that can be incorporated in the electromagnetic induction actuator of this invention.

In the wiring layout of the coil 3, as shown in FIG. 6, the outer brim 2a and the center cap 2b of the diaphragm 2 are divided by a deep drawing, and the leads 3a (3b) of the coil 3 can be draw outward from that division.

In this diaphragm 2, the flange portion of the outer brim 2a is made up of a side wall 20a that drops to the extent of the thickness of the pole piece 8 and serves as a holder for the coil 3, and an extension 20b that extends inward from the side wall 20a. The flange portion of the center cap 2b, on the other hand, is made up of a sidewall 21a that extends to the outer surface position of the pole piece 8 and serves as a holder for the coil 3, and an extension 21b that extends outward from the sidewall 21a.

In this diaphragm 2, the side wall 20a and extension 20b of the outer brim 2a are attached to the side and bottom of the coil 3 as a holder, and the top of the coil 3 is adhered to the extension 21b of the side wall 21a of the center cap 2b. By this means, it is possible to draw out the lead wire 3a (3b) of the coil 3 from a point outside the extension 21b of the center cap 2b, and the voice coil 3 is mounted stably between the flange portions of the outer brim 2a and the center cap 2b.

Figure 7:
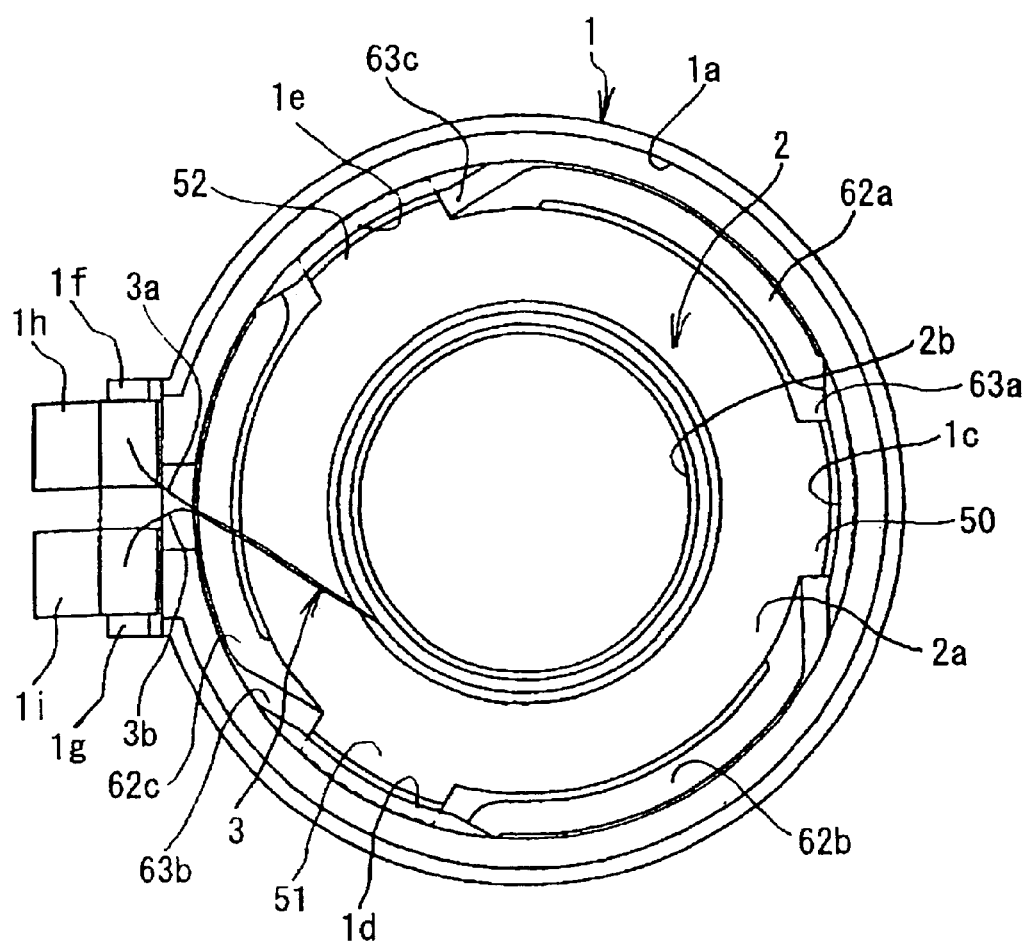
FIG. 7 is a plane view of the electromagnetic induction actuator in FIG. 3, incorporating the coil wiring layout shown in FIG. 6.

In the wiring layout of this coil, as shown in FIG. 7 (a plane view of the assembled actuator of FIG. 1), the lead wires 3a, 3b of the coil 3 can be connected to the terminal fittings 1h, 1i over the top of the diaphragm 2. This is done to avoid contact during vibration between the lead wires 3a, 3b of the coil 3 are kept from contact with the magnetic circuit accommodated within the housing 1, and so snapping of the lead wires 3a, 3b of the coil 3 can be prevented.

The mode of implementation described above was explained as an electromagnetic induction actuator with a double suspension structure provided by the springs 6, 7, but the invention can be applied to an electromagnetic induction actuator with one spring as well.

Now, the terms and expressions in the specification of this invention are used to give an easily understood explanation of this invention; the terms and expressions used in no way limit the content of the explanation. There has been no intention of excluding anything equivalent to the mode of the invention described above, or to any part thereof, by the use of limiting terms or expressions. It is clear, therefore, that various changes can be made within the scope of the invention for which rights are claimed.

POTENTIAL FOR INDUSTRIAL USE

As described above, by means of the electromagnetic induction actuator of this invention (the 1st invention), it is possible to align the tabs of the yoke with the corresponding recesses of the springs and to fit the inner rings of the springs around the outer periphery of the yoke, and thus mount the yoke and springs together within the housing, with no contact between the tabs of the yoke and the springs. It is also possible by means of the tabs to maintain the weight needed for the action of the springs even though the thickness of the yoke is reduced. Moreover, because the springs are assembled within the thickness of the yoke, it is possible to maintain the thinness of the spring assembly, including the yoke, and to keep the housing small even using the tabs as stoppers for shock resistance. The actuator as a whole can be assembled as a thin and small unit.

With the outer periphery of the yoke fitted into the inner diameter of the 1st spring with the tabs of the yoke positioned inside the corresponding recesses on the 1st ring, and the stopper ring fitted around the outer periphery of the yoke and pressing against inner ring of the spring, and with the tabs of the yoke positioned corresponding to the recesses of the 2nd spring and the inner ring of the 2nd spring fitted around the outer periphery of the yoke contacting the stopper ring, and the ring washer is fitted around the outer periphery of the yoke and presses against the inner ring of the spring. Because the outer rings of the 1st and 2nd springs are fitted inside the inner diameter of the housing so that the yoke and springs are mounted together within the housing, contact between the tabs of the yoke and the springs is avoided. Because the thickness of the actuator as a whole can be held down, it can be assembled in a thin and small format, and the constituent parts can be positioned on the yoke easily. Moreover, because the L-shaped tabs descend in the direction of the thickness of the yoke, it is possible to keep the weight balance of the yoke as a whole even, and to take advantage of the double-suspension springs to assemble a product with good amplitude, good vibratory balance and good acoustical properties.

A spacer ring is sandwiched between the outer rings of the springs, and the outer rings of the springs are fitted within the inner diameter of the housing. The outer ring of the 1st spring presses against the stop rims extending inward near an opening of the housing, the raised rim of the cover fits into the opening of the housing corresponding to the diaphragm, and the outer ring of the 2nd spring is pressed by the raised rim of the cover so that the springs and yoke together are held in place within the housing. The tabs on the yoke serve as stoppers for shock resistance, and so it is possible to assemble easily a product with good vibratory balance, and one that has excellent acoustical characteristics.

By means of the electromagnetic induction actuator of this invention (the 2nd invention), it is possible to align the tabs of the stopper ring with the corresponding recesses of the springs and to fit the inner rings of the springs around the outer periphery of the yoke, and thus mount the yoke and springs together within the housing, with no contact between the tabs of the stopper ring and the springs. It is also possible by means of the tabs on the stopper ring to maintain the weight needed for the action of the springs. Moreover, because the springs are assembled within the thickness of the yoke, it is possible to maintain the thinness of the spring assembly, including the yoke, and to keep the housing small even using the tabs as stoppers for shock resistance. The actuator as a whole can be assembled as a thin and small unit.

With the outer periphery of the yoke fitted into the inner diameter of the 1st spring, the tabs of the stopper ring are aligned with the corresponding recesses on the 1st ring, and the stopper ring fitted around the outer periphery of the yoke pressing against the inner ring of the spring. With the tabs of the stopper ring positioned corresponding to the recesses of the 2nd spring, the inner ring of the 2nd spring fitted around the outer periphery of the yoke contacting the stopper ring, and the ring washer is fitted around the outer periphery of the yoke and presses against the inner ring of the spring. Because the outer rings of the 1st and 2nd springs are fitted inside the inner diameter of the housing so that the yoke and springs are mounted together within the housing, contact between the tabs of the yoke and the springs is avoided. Because the thickness of the actuator as a whole can be held down, it can be assembled in a thin and small format, and the constituent parts can be positioned on the yoke easily. Moreover, because tabs intervene between the springs, it is possible to keep the weight balance of the yoke as a whole even, and to take advantage of the double-suspension springs to assemble a product with good amplitude, good vibratory balance and good acoustical properties.

A spacer ring is sandwiched between the outer rings of the springs, and the outer rings of the springs are fitted within the inner diameter of the housing. The outer ring of the 1st spring presses against the stop rims extending inward near an opening of the housing, the raised rim of the cover fits into the opening of the housing corresponding to the diaphragm, and the outer ring of the 2nd spring is pressed by the raised rim of the cover so that the springs and yoke together are held in place within the housing. The tabs on the yoke serve as stoppers for shock resistance, and so it is possible to assemble easily a product with good vibratory balance, and one that has excellent acoustical characteristics.

Using the electromagnetic induction actuator of this invention, it is possible to constitute a product with good acoustical properties by assembling either of the electromagnetic induction actuators described above.

What is claimed is:

1. An electromagnetic induction actuator with a round housing that encloses a diaphragm that transmits vibrations;
    a magnetic circuit that consists of a voice coil mounted on the inner surface of the diaphragm, a magnet for the magnetic circuit, a yoke that surrounds and supports the magnet, and a pole piece;
    and at least one thin spring that supports the magnetic circuit; the components being assembled with the springs fitted into the inner surface of the housing supporting the magnetic circuit, including the magnet, with the diaphragm fitted into an opening in the housing, and with a voice coil positioned close to the magnetic circuit;
    there being a number of tabs that act as shock resistance stoppers located at equal intervals around the outer rim of the yoke extending toward the inner surface of the wall of the housing;
    and a spring that has an inner ring that fits the outer periphery of the yoke, an outer ring that fits the inner diameter of the housing, bridge arms that are spaced at equal distances around the circumference of the two rings and that connect the inner and outer rings, and recesses that are spaced at the same intervals as the bridge arms and that correspond to the positions of the tabs on the yoke;
    the yoke and spring together being assembled within the housing by positioning the tabs of the yoke in the recesses of the spring with the outer periphery of the yoke fitted into the inner diameter of the spring, and the outer ring of the spring fitted into the inner diameter of the housing.

2. An electromagnetic induction actuator as described in claim 1 above, which is constituted with two springs of the same shape, a yoke having shock resistance stoppers in the form of L-shaped tabs that descend from its outer rim, and a stopper ring and ring washer that fit around the outer periphery of the yoke;
    the outer periphery of the yoke being fitted into the inner diameter of the 1st spring with the tabs of the yoke positioned inside the corresponding recesses on the 1st ring, and the stopper ring being fitted around the outer periphery of the yoke and pressing against inner ring of the spring;
    and with the tabs of the yoke positioned corresponding to the recesses of the 2nd spring and the inner ring of the 2nd spring fitted around the outer periphery of the yoke and contacting the stopper ring, the ring washer fitted around the outer periphery of the yoke and pressing against the inner ring of the spring, and the outer rings of the 1st and 2nd springs fitted inside the inner diameter of the housing so that the yoke and springs are mounted together within the housing.

3. An electromagnetic induction actuator as described in claim 2 above, having a spacer ring sandwiched between the outer rings of the springs, and a cover that has a raised rim that fits inside the housing, with the spacer ring sandwiched between the outer rings of the springs, and the outer rings of the springs fitted into the inside diameter of the housing, the outer ring of the 1st spring pressing against the stop rim that is inside the housing near the opening, and the raised rim of the cover being fitted into an opening in the housing on the side opposite the diaphragm, and with the yoke and springs together being assembled within the housing by means of the raised rim of the cover pressing against the outer ring of the 2nd spring.

4. An electromagnetic induction actuator with a round housing that encloses a diaphragm that transmits vibrations;
    a magnetic circuit that consists of a voice coil mounted on the inner surface of the diaphragm, a magnet for the magnetic circuit, a yoke that surrounds and supports the magnet, and a pole piece;
    and at least one thin spring that supports the magnetic circuit; the components being assembled with the springs fitted into the inner surface of the housing supporting the magnetic circuit, including the magnet, with the diaphragm fitted into an opening in the housing, and with a voice coil positioned close to the magnetic circuit;
    there being a number of tabs that act as shock resistance stoppers located at equal intervals around the outer periphery of a stopper ring, extending toward the inner surface of the wall of the housing;
    and a spring that has an inner ring that fits the outer periphery of the yoke, an outer ring that fits the inner diameter of the housing, bridge arms that are spaced at equal distances around the circumference of the two rings and that connect the inner and outer rings, and recesses that are spaced at the same intervals as the bridge arms and that correspond to the positions of the tabs on the stopper ring;
    the yoke and spring together being assembled within the housing by positioning the tabs of the stopper ring in the recesses of the spring with the inner ring of the spring pressed by fitting the stopper ring into the outer periphery of the yoke, and the outer ring of the spring fitted into the inner diameter of the housing.

5. An electromagnetic induction actuator as described in claim 4 above, constituted with two springs of the same shape, a stopper ring having shock resistance stoppers in the form of L-shaped tabs that extend from its outer rim, and a ring washer that fit around the outer periphery of the yoke; the outer periphery of the yoke being fitted into the inner diameter of the 1st spring with the tabs of the stopper ring positioned inside the corresponding recesses on the 1st ring, and the stopper ring being fitted around the outer periphery of the yoke and pressing against inner ring of the spring;

and with the tabs of the stopper ring positioned corresponding to the recesses of the 2nd spring and the inner ring of the 2nd spring fitted around the outer periphery of the yoke and contacting the stopper ring, the ring washer fitted around the outer periphery of the yoke and pressing against the inner ring of the spring, and the outer rings of the 1st and 2nd springs fitted inside the inner diameter of the housing so that the yoke and springs are mounted together within the housing.

6. An electromagnetic induction actuator as described in claim 5 above, having a spacer ring sandwiched between the outer rings of the springs, and a cover that has a raised rim that fits inside the housing, with the spacer ring sandwiched between the outer rings of the springs, and the outer rings of the springs fitted into the inside diameter of the housing, the outer ring of the 1st spring pressing against the stop rim that is inside the housing near the opening, and the raised rim of the cover being fitted into an opening in the housing on the side opposite the diaphragm, and with the yoke and strings together being assembled within the housing by means of the raised rim of the cover pressing against the outer ring of the 2nd spring.

* * * * *